United States Patent [19]

Wiley, deceased et al.

[11] Patent Number: 4,864,309

[45] Date of Patent: Sep. 5, 1989

[54] MICROWAVE RADIOMETER

[75] Inventors: Carl A. Wiley, deceased, late of Westchester; by Jean B. Wiley, administratrix, Corona del Mar, both of Calif.

[73] Assignee: Hughes Aircraft Company, Los Angeles, Calif.

[21] Appl. No.: 86,452

[22] Filed: Aug. 18, 1987

[51] Int. Cl.$^4$ ............................ G01S 3/02; G01S 5/02
[52] U.S. Cl. ................................. 342/351; 342/383; 342/378; 342/375; 342/424; 342/446
[58] Field of Search ............... 342/351, 383, 378, 379, 342/380, 381, 382, 384, 375, 424, 446; 364/824

[56] References Cited

U.S. PATENT DOCUMENTS

| | | | |
|---|---|---|---|
| 3,307,193 | 2/1967 | Kaufman | 342/424 |
| 3,438,035 | 4/1969 | Fling et al. | 342/375 |
| 3,546,700 | 12/1970 | Rihaczek | 342/378 |
| 3,803,613 | 4/1974 | Wright | 342/427 |
| 4,070,675 | 1/1978 | Daniel et al. | 342/380 |
| 4,213,131 | 7/1980 | Kaiser, Jr. | 342/424 |
| 4,518,256 | 5/1985 | Schwartz | 342/139 |
| 4,528,674 | 7/1985 | Sweeney et al. | 342/383 |
| 4,646,099 | 2/1987 | Apostolos | 342/375 |
| 4,654,666 | 3/1987 | Wiley | 342/351 |
| 4,701,762 | 10/1987 | Apostolos | 342/446 |

Primary Examiner—Thomas H. Tarcza
Assistant Examiner—David Cain
Attorney, Agent, or Firm—Steven M. Mitchell; Wanda K. Denson-Low

[57] ABSTRACT

A microwave radiometer is formed of a set of frequency scanning antennas disposed parallel to each other and connected by a common microwave feeder. Signals of individual ones of the antennas are translated to different intermediate frequencies such that differences between the intermediate frequencies are proportional to baseline spacings between pairs of antennas of nested interferometers. A correlator containing parallel delay lines and a set of multiplier channels coupled to paired taps of the delay lines receives signals at the intermediate frequencies to produce a set of correlation signals. A two-dimensional Fourier transformation is applied to the correlation output signals to provide the power spectral density of microwave radiation incident upon the array of antennas.

12 Claims, 4 Drawing Sheets

MICROWAVE RADIOMETER

BACKGROUND OF THE INVENTION

This invention relates to a system for the detection of radiation emanating from a source, such as objects illuminated by sunshine, and, more particularly, to a system incorporating a microwave antenna array for the detection of radiated power in the microwave portion of the spectrum, the system including correlation and Fourier transform circuitry coupled to the antenna array by a common microwave feed for reduced complexity of the microwave structure.

Various types of devices are employed for sensing radiation emmited by distant objects. For example, devices employing detectors of infrared radiation are used in detecting the presence of radiators of infrared radiation. In radio astronomy, RF (radiofrequency) telescopes employing an array of antennas detects the presence of RF energy emitted by distant stars.

In the case of systems which are constructed for the detection of energy in the microwave portion of the spectrum, considerable microwave structure, in the form of numerous waveguide components, has been employed to connect various antenna elements in an array of such elements to process microwave signals received by the antenna elements. The signal processing has involved the amplification of signals of various microwave channels, as well as combination of the signals of the various elements to obtain directional information about the source of radiation.

A problem arises in that the microwave structure which interconnects the various antenna elements introduces excessive size, weight, and complexity to the microwave radiometer. Such complexity is manifested in numerous waveguides which interconnect the antenna elements with signal processing equipment.

SUMMARY OF THE INVENTION

The aforementioned problem is overcome and other advantages are provided by a microwave radiometer system comprising an array of antennas positioned for receiving microwave radiation from a source of such radiation. The antennas are each coupled to a common microwave feeder by mixers which serve to translate the spectra of received radiation at each of the antennas to an intermediate frequency, there being a separate intermediate frequency for each of the antennas.

The common feeder sums together all of the intermediate-frequency signals of the antennas to provide a sum signal. The sum signal is amplified and applied to a correlator which produces an autocorrelation of the sum signal. With respect to the individual intermediate-frequency components of the sum signal, the effect of the correlation operation is to produce crosscorrelations of the individual antenna signals. The components of the correlation function are extracted and applied to a Fourier transformer to produce the power in the spectral portions of radiation received at the antennas for each antenna beam. In the case where each antenna is a frequency-scanning antenna scanning in a direction perpendicular to a line of the array of antennas, a two-dimensional array of pixels associated with corresponding beam positions is attained for an output image.

A feature of the invention is the reduction in the amount of microwave components required to obtain the power data of the radiation emitted by the source. This feature is obtained by use of the common microwave feeder in conjunction with the mixers and circuitry which are able to extract data from the sum of the antenna signals in the feeder. The correlator is constructed in a simple format wherein two tapped delay lines feed signals in opposite directions, and wherein square-law detectors are coupled to paired output taps of the delay lines for multiplying tapped signals. Banks of bandpass filters extract various components from the multiplications, which components are obtained from the crosscorrelation of the many intermediate-frequency signals of the respective antennas.

The array of antennas can be simplified by thinning the array by an arrangement wherein the set of uniformly spaced antennas, sixty-four antennas by way of example, can be replaced by a smaller set of antennas, eight antennas, which are nonuniformly spaced. The number of antennas, eight, is equal to the square root of the original number of antennas. The nonuniform spacing permits various combinations of the eight antennas to provide a set of nested interferometers having a complete set of baselines ranging from the minimal spacing between two antennas up to the length of the array. In this case, the values of the intermediate frequencies are selected to be proportional to the spacings between the antennas of the thinned array. Any redundancy in interferometer pairs of antennas having the same baseline appear at the same intermediate frequency so as to be combined in the correlation operation.

BRIEF DESCRIPTION OF THE DRAWING

The foregoing aspects and other features of the invention are explained in the following description, taken in connection with the accompanying drawings wherein.

DETAILED DESCRIPTION

Figure 1A:
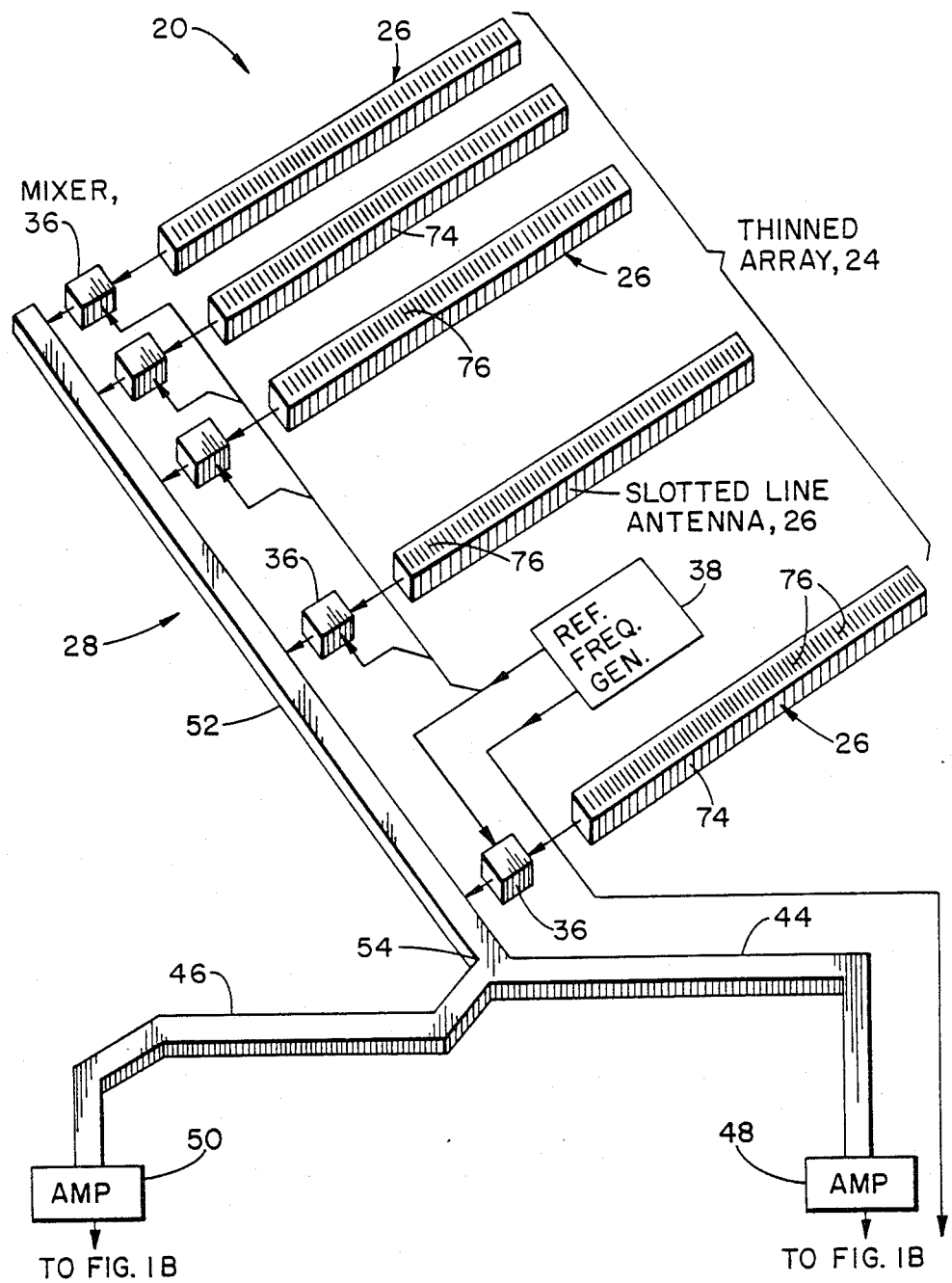
FIGS. 1A–1B are a diagrammatic view of a radiometer of the invention constructed with a thinned array of antennas coupled via mixers to a common microwave feeder for processing of received signals by a correlator and Fourier transformer.
Figure 1B:
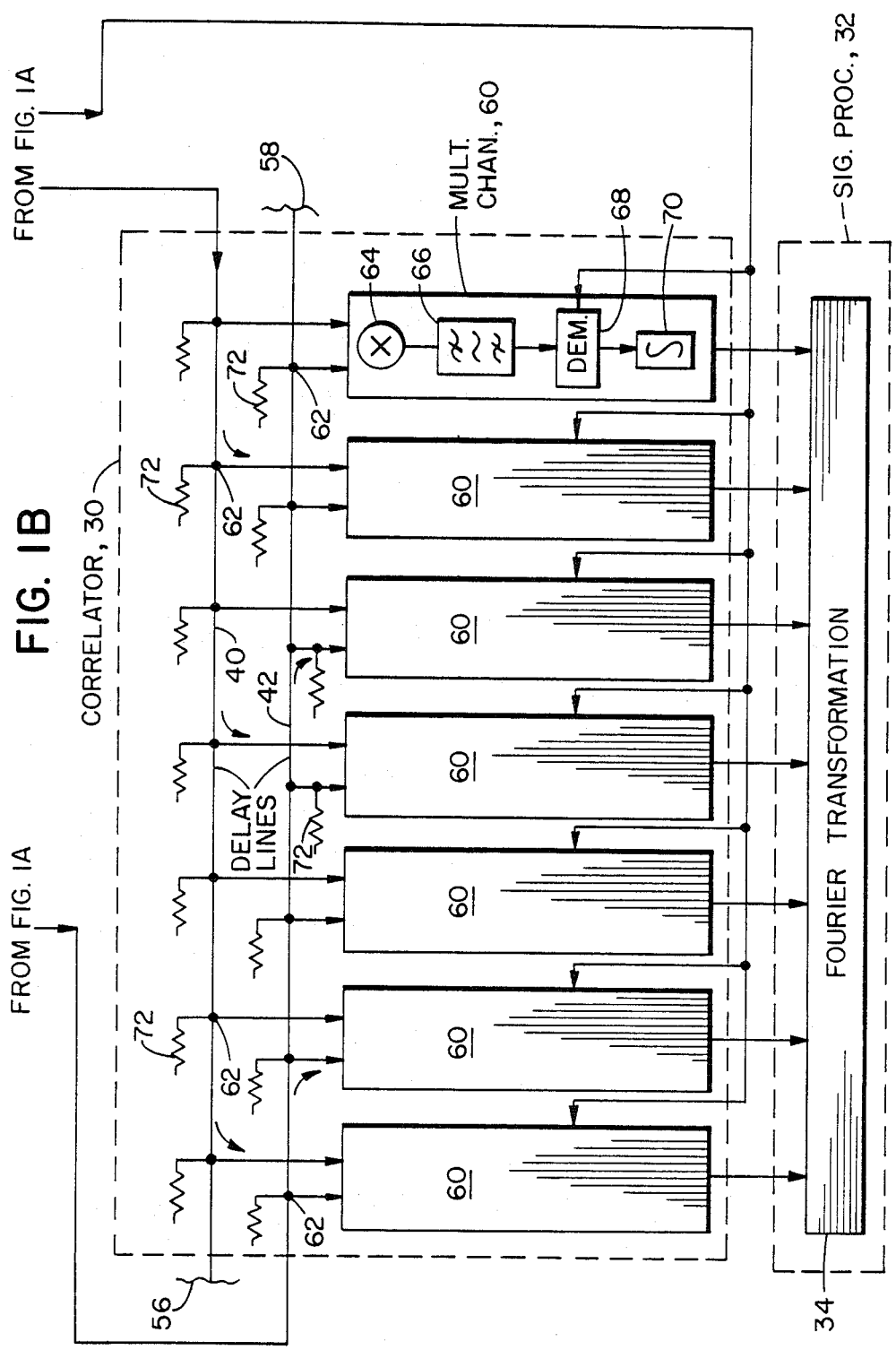
Figure 2:
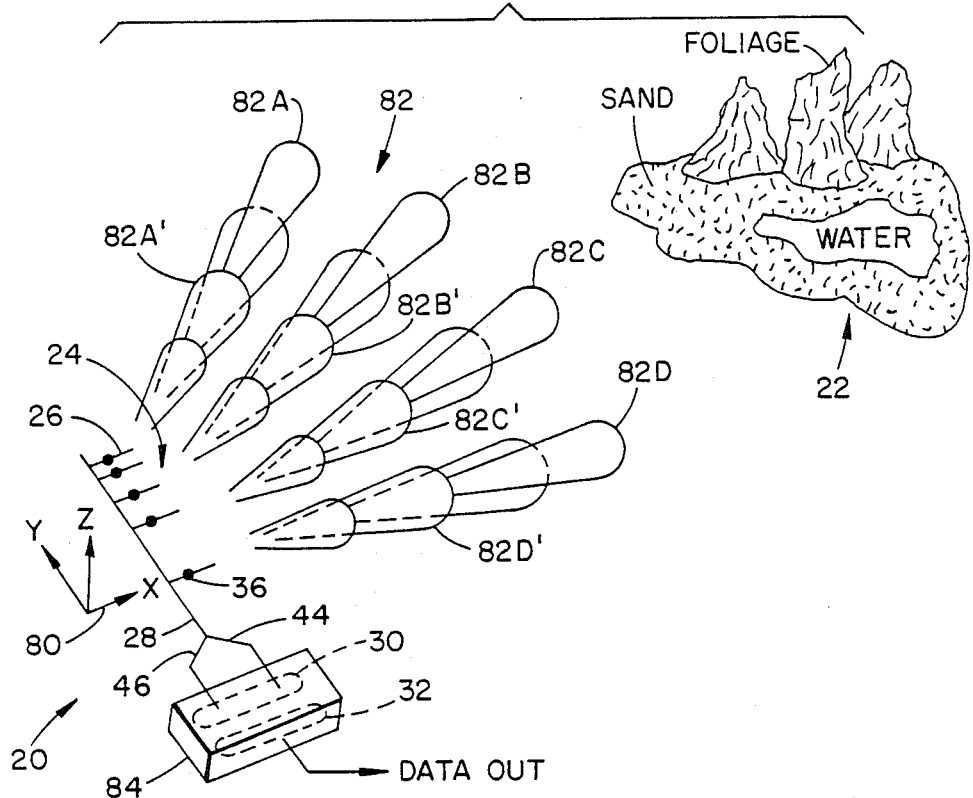
FIG. 2 shows lobes of a radiation pattern of a frequency scanning antenna of FIG. 1 directed towards a source of radiation.

With reference to FIGS. 1 and 2, there is shown a microwave radiometer 20 positioned for receiving microwave radiation emanating from a source 22 of electromagnetic radiation. The source 22 may be a man-made object such as an airborne vehicle, or a natural object such as ground covered with foliage. While the source 22 may emit radiation in various portions of the electromagnetic spectrum, including the infrared and the ultraviolet, the radiometer 20 is constructed in accordance with the invention for viewing the microwave portion of the spectrum of radiation emitted by the source 22.

The radiometer 20 comprises an array 24 of antennas 26 which are coupled via a common feeder 28 to a correlator 30, and a signal processor 32 including a Fourier transformer 34 coupled to the correlator 30 for obtaining the power spectrum of the microwave radiation of the source 22. A set of mixers 36 connect the antennas 26 to the feeder 28. The mixers 36 translate a frequency of radiation received by the respective antennas 26 to a set of different intermediate frequencies (IF), a specific IF for each antenna, by mixing received radiation signals with respective reference signals provided by a reference frequency generator 38.

The radiometer 20 is operable with an array of equally spaced antennas, or a thinned array wherein substantially fewer antennas are employed with varied spacings between the antennas. In the thinned array, the spacings are selected to provide a set of nested interferometer baselines which, while fewer than the set of nested baselines present in an array of equally spaced antennas, are adequate for defining a set of beam positions unambiguously. The thinned array is shown in FIG. 1, and is employed in the preferred embodiment of the invention to reduce overall weight of the antenna array, and to reduce complexity of electronic circuitry used in processing the signals of the various antennas.

The correlator 30 comprises a pair of tapped delay lines 40 and 42 which are coupled to branches 44 and 46 of the feeder 28 by amplifiers 48 and 50. The two branches 44 and 46 are coupled to a main portion 52 of the feeder 28 by a power splitter 54. Signals received in the feeder 28 from the mixers 36 are applied equally to the amplifiers 48 and 50 which amplify the signals to a power level suitable for operation of the delay lines 40 and 42. Signals outputted by the amplifiers 48 and 50 propagate in opposite directions along the delay lines 40 and 42 to terminating loads 56 and 58, respectively, which loads are matched to the respective lines to prevent reflection of the signals.

The correlator 30 further comprises set of multiplier channels 60 which are connected to the delay lines 40 and 42 by taps 62. The taps 62 each are constructed as a directional coupler for extracting a fraction of the signal on each line 40 and 42. The taps 62 are arranged in pairs for applying signals from each to the lines 40 and 42 to corresponding ones of the channels 60. As will be described in further detail with reference to FIG. 6, each of the channels 60 includes a multiplier 64, a plurality of band-pass filters 66, synchronous demodulators 68 and integrators 70, one of each of these components being shown for simplicity in a channel 60 of FIG. 1. In each of the channels 60, the multiplier 64 receives the signals from a pair of taps 62, multiplies the two signals together, and outputs the product to the filters 66. After filtering, various correlation components, as will be explained hereinafter, are extracted synchronously by the demodulators 68 with the aid of a set of reference frequencies provided by the generator 38. Signals outputted by the demodulators 68 are at baseband, and are then integrated by the integrators 70 to provide output signals of the correlator 30.

Each of the taps 62 is terminated with a load 72, the loads 72 absorbing signals outputted at the taps to prevent reflection of the signals back into the delay lines 40 and 42. The signals outputted by the channels 60 of the correlator 30 constitute a set of terms of a correlation function suitable for conversion, by Fourier transformation, to the power spectrum of the microwave signal emitted by the source 22.

With reference to FIGS. 1–5, each of the antennas 26 is fabricated, by way of example, as a length of waveguide 74 of rectangular cross section and having a series of radiating elements for receiving incoming radiation, the elements being formed as slots 76 in a broadwall of the waveguide 74. The slots 76 are spaced apart equally from each other to provide a fan beam 78 of radiation at a central frequency of a band of interest. At other frequencies of radiation, the fan beam 78 is tilted about a longitudinal axis of a waveguide 74, as shown at 78A and 78B, the direction of tilt depending on whether the frequency has increased or decreased in the accordance with well-known construction of beams by slotted antennas. The fan beam 78 is narrowed, as viewed in the sideview of FIG. 3, by increasing the length of the waveguide 74.

The source 22 is portrayed, by way of example, as a scene including foliage and water in the form of a pond located in a sandy region in front of the foliage. This subject matter provides for a wide range of spectral components of electromagnetic radiation. Upon orienting an antenna 26 with the slots 76 facing the source 22, a beam of the array 24 receives radiation from the source 22.

Each of the antennas 26 is a frequency-scanning antenna in the sense that a different frequency of radiation provides for a different orientation of a beam. The operation of the antenna 26 is reciprocal so that the same beam pattern results either on transmission or reception of radiation via the slots 76. Thus, a specific beam direction is associated with each frequency of microwave radiation received from the source 22. In the case of a small source of radiation (not shown) such as an aircraft, the value of the frequency received indicates the specific beam receiving the radiation and, hence, the direction of the aircraft as measured along the axis of the waveguide 26. This corresponds to the x direction of the coordinate axes shown in FIG. 2 at 80.

Figure 3:
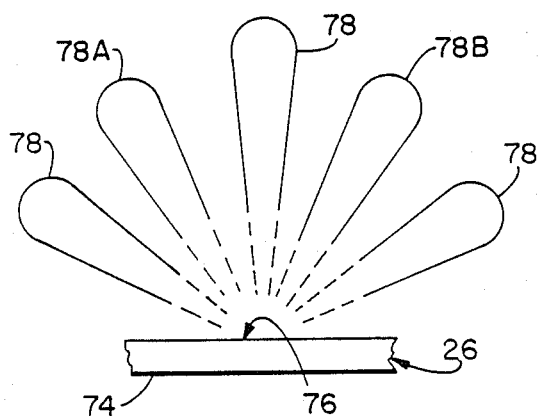
FIG. 3 shows a side view of one antenna of FIG. 1 and beams of radiation therefrom.
Figure 4:
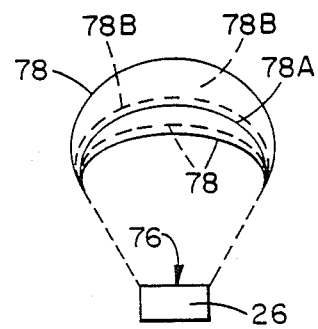
FIG. 4 shows an end view of one antenna of FIG. 1 and beams of radiation therefrom.

Upon placing a plurality of the waveguides 26 side-by-side to form the array 24, the fan beam 78, as shown in the end view of FIG. 4, is broken into a set of pencil beams 82 of which, by way of example, four beams 82A–D are arranged side-by-side in the yz plane. The tilted fan beam 78A of FIGS. 3 and 4 is divided into a set of beams indicated at 82A'–D'. Thus, the beams 82 radiate into a sector of space which may be described as a two-dimensional array of beams identified by both the x and y coordinates. If desired, the array 24 may be oriented such that a sector scan in the x coordinate corresponds to elevation, and a sector scan in the y coordinate corresponds to azimuth.

A feature of the invention, as has been noted above, is the significant reduction in the weight and physical size of the equipment of which the radiometer 20 is composed. This is readily seen in FIG. 2 wherein the array 24 has been thinned by removal of most of the antennas which would be present if the array were composed of equally spaced apart antennas. The antennas 26 in combination with mixers 36 and the common feeder 28 constitute the complete microwave portion of the radiometer 20. The remaining portion of the radiometer 20 is formed of electronic circuitry which constitutes the correlator 30 and the signal processor 32, the circuitry being enclosed conveniently within a case 84 affixed to the feeder branches 44 and 46. The processor 32 outputs power spectral data of the scene being viewed by the radiometer 20.

Figure 5:
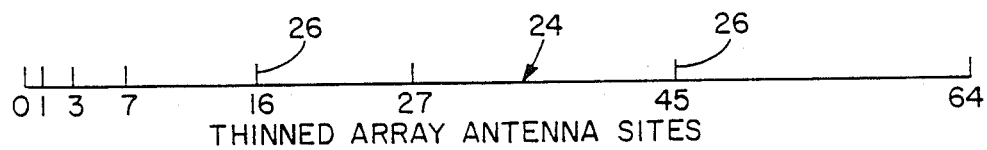
FIG. 5 shows positions of antennas of FIG. 1 to accomplish a thinning of the array.

With respect to the thinning of the array, it has been found to be useful to thin the array by a factor equal to the square root of the number of antennas in an array of equally-spaced antennas. For example, if an array of equally spaced antennas were to include 256 antennas, then the thinned array would have 16 antennas. To simplify the description of the invention, it is assumed herein that the embodiment of the invention employs an array based on an equally-spaced antenna array of 64 antennas, which number of antennas has been thinned to eight antennas located at the sites along the y axis depicted in FIG. 5. Only five of the antennas 26 are shown in FIGS. 1 and 2 to simplify the drawing. The units shown along the axis of FIG. 5 are multiples of the shortest interferometer baseline; they may be any convenient unit of measure, such as a wavelength or one-half wavelength at the center frequency of radiation.

In an array of equally-spaced antennas, every pair of antennas constitutes an interferometer for viewing incoming radiation. The spacing between the antennas of the interferometer is the baseline of the interferometer. In the case of the equally-spaced antennas, all baselines are present from the shortest baseline, between two successive antennas, to the longest baseline, equal to the length of the array. It is also apparent that there are numerous redundant interferometers in the sense of plural interferometers having equal baselines. In the arrangement depicted in FIG. 5, there are no redundant interferometers, and only approximately one half of the possible baselines are present. However, the lengths of the available baselines of the thinned array are distributed throughout the total range of lengths, there being short, medium, and long baselines. Long baselines are present at or near the maximum values for resolution of points of the source 22, while other values of baseline including the smallest baselines are available for resolving any ambiguities associated with measurements made by interferometers at the longer baselines. Thus, the array 24 provides two-dimensional imaging data wherein imaging data measured along the y coordinate axis corresponds to Fourier spatial frequency, and wherein imaging data measured along the x coordinate axis corresponds to the frequency of radiation signals received at the array 24. It is to be understood that the thinned array of FIG. 5 is presented only by way of example, and that additional antennas may be employed within the same length of array so as to provide more values of baseline for the nested interferometers, the increased number of antennas also providing for redundancy in some of the values of baseline.

Figure 6:
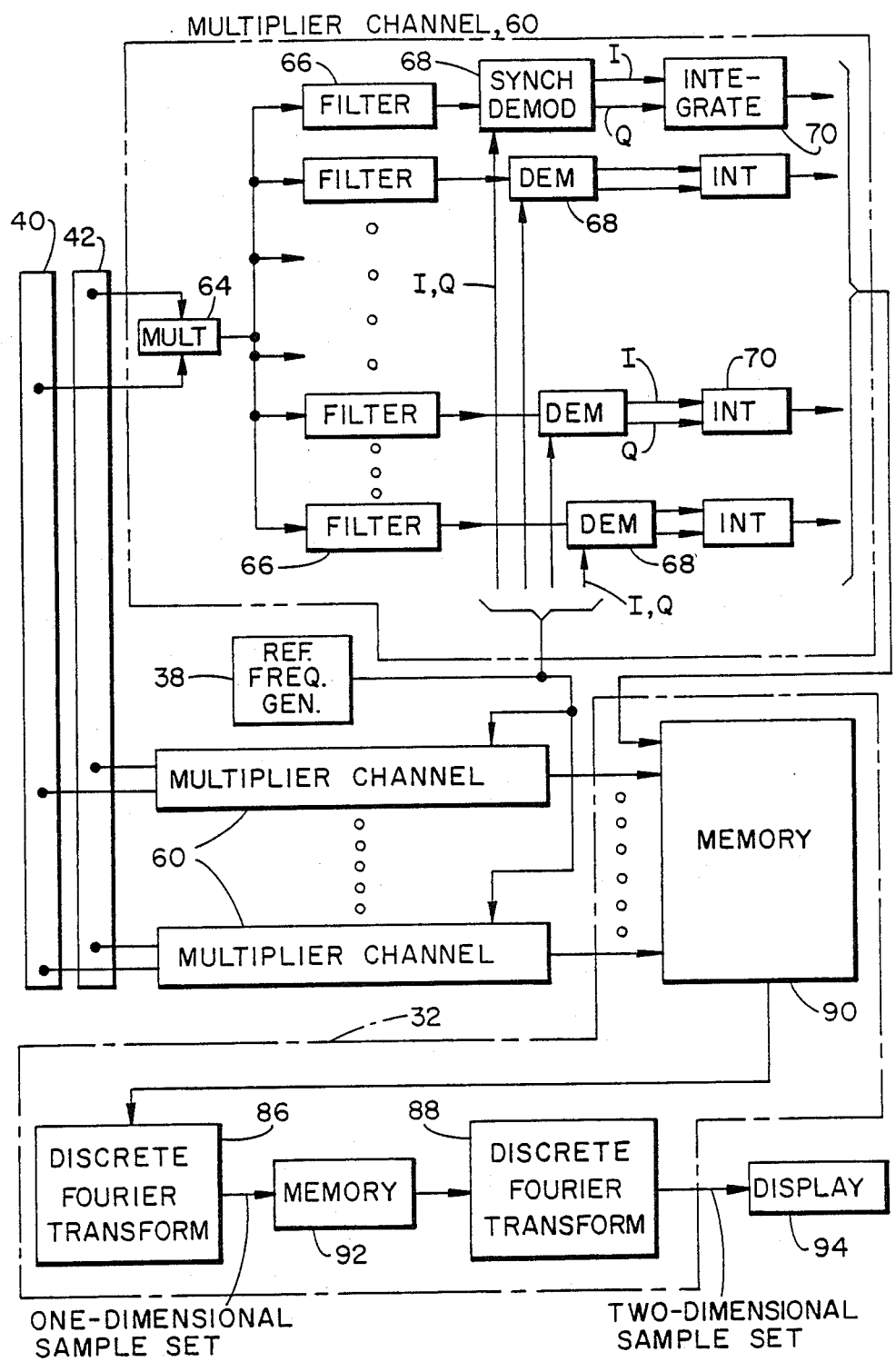
FIG. 6 shows details of a correlator channel and signal processing circuitry of FIG. 1.

With reference to FIG. 6, there are shown further details in the construction of the multiplier channels 60 and the signal processor 32 of FIG. 1. The Fourier transformer 34 of FIG. 1 provides for a two-dimensional transformation which is accomplished, as shown in FIG. 6, by means of two discrete Fourier transformers which operate in conjunction with two memories 90 and 92. The first transformer 86 produces components of the power spectrum associated with the spatial frequency spectrum along the y axis of the antenna array 24. The second transformer 88 produces components of the power spectrum in the x direction in correspondence with the spectral distribution of the beams 82 along an antenna 26. Power spectral data may be presented on a display 94 coupled to an output terminal of the transformer 88.

The memory 90 is employed for storing sets of component values of the correlation operation outputted by each of the multiplier channels 60. Upon completion of the storage of a complete set of the correlation component values, these values are then extracted in a desired order for use by the transformer 86. As is well known, the transformers 86 and 88 may be constructed in the form of array transformers operating in accordance with well-known Fourier transform algorithms. Sets of Fourier transform component values are outputted by the transformer 86 and are stored in the memory 92. Upon completion of the storage of a desired set of the component values of the first transformer 86, these values can then be outputted from the memory 92 in a desired order for performing the second Fourier transformation in the orthogonal coordinate by the second transformer 88. Thus, it is seen that the memories 90 and 92 serve to rearrange correlation and Fourier component values to enable subsequent stages of Fourier transformation.

As noted above, each of the multiplier channels 60 comprises a plurality of the bandpass filters 66, a plurality of the synchronous demodulators 68, and a plurality of the integrators 70. Each of the filters 66 has an input terminal coupled to a common output terminal of the multiplier 64. The output terminal of each filter 66 is then serially connected via a demodulator 68 to a corresponding one of the integrators 70. The reference generator 38 provides both inphase and quadrature reference signals to each of the demodulators 68 to output on separate lines the inphase and the quadrature components of the demodulated signal. The frequency of the inphase and quadrature reference signals applied to each of the demodulators 68 is equal to the center frequency of the passband of each of the filters 66. While each of the demodulators 68 is shown as a single block in FIG. 6, it is to be understood that each of the demodulators 68 includes two sections, one for providing the inphase demodulation and the other for providing the quadrature demodulation. Also, while each of the integrators 70 is shown as a single block in FIG. 6, it is to be understood that each of the integrators 70 comprises two sections, one for integrating the inphase component and the other for integrating the quadrature component of the demodulated signal. The inphase and quadrature components outputted by each of the integrators 70 is applied to the memory 90.

In the fabrication of the multiplier 64, it is convenient to use a nonlinear circuit element such as a PIN diode wherein the sum of the two input signals to the multiplier 64 is applied to the diode. The diode acts as a square law detector. As is well known, the resulting output signal of the diode contains a number of components at different frequencies, which frequencies are arithmetic sums of the frequencies of sinusoidal waveforms appearing at the taps 62. Assuming that each of the output components is of sufficiently narrow bandwidth so as to avoid overlapping spectral portions, the product of any two of the sinusoidal waveforms propagating in the delay lines 40 and 42 can be selected by a filter 66 tuned to the specific frequency of the desired product term. In the case where several sinusoids of differing frequencies may be present in each of the delay lines 40 and 42, components of the product outputted by the multiplier 64 appear at many frequencies, this necessitating a relatively large number of filters 66, as will be described subsequently, for capturing the various components of the product.

In operation, the antenna array 24 cooperates with the correlator 30 to provide a set of correlator output signals suitable for the two-dimensional Fourier transformation in the signal processor 32. In addition to forming the beams, the antennas 26 also provide a filtering function by limiting the bandwidth of radiation present in any one of the beams 82.

The bandwidth limitation of an antenna 26 may be understood by considering the numerous slots 76 arranged along the length of the waveguide 74. By way of example, in the case of incident radiation at a nominal frequency of 10 GHz (gigahertz), wherein the wavelength is one centimeter, an antenna length of 40 meters is equivalent to 4000 wavelengths. At a nominal radiation frequency of 20 GHz, the equivalent length of the antenna is 8000 wavelengths. The slots 76 may be spaced apart with any spacing customarily employed in the construction of slotted antennas, such spacing being typically in the range of one-half wavelength to one wavelength at the midband frequency of the radiation. In the case of a beam formed at a radiation frequency of 20 GHz, the beam has a specific angle of orientation relative to the antenna 26 for which all of the contributions of radiation at the various slots 76 sums cophasally. A shift in frequency in excess of one part in 16,000 parts is sufficient to introduce phase shifts of received radiation in excess of 180 degrees resulting in destructive interference. Thus, the band of frequencies for which little attenuation occurs within the beam of radiation would be approximately 1.25 MHz (megahertz). In this way, the frequency scanning property of the antenna 26 tends to limit the bandwidth of radiation received in any one beam. In the foregoing situation, by way of example, there would be significant attenuation of frequency components near the edges of a frequency band of 2 MHz. Accordingly, in the ensuing discussion, it may be presumed that for any signal received in a fan beam 78 (FIG. 3) or in a pencil beam 82 (FIG. 2) at frequencies close to 20 GHz, that there are no significant frequency components at the edge of a band having a width of 2 MHz.

The foregoing frequency limitation produces an interesting result, namely that a wide bandwidth radiator of microwave radiation emits radiation which is detectable within one, but only one, of the beams 82 of the array 24. The received frequency designates which of the beams is directed towards the radiator and, thereby, provides information as to the location of the radiator.

The foregoing theory of frequency dependency of the beams applies also to other embodiments of the antennas 26. For example, the radiating elements of the antennas 26 might have a configuration other than slots, and may be fabricated as a set of discrete radiators such as loaded stubs and cavity-backed resonators joined by a common feed. Phase shifters and delay elements may also be employed in the formation of a beam. However, the foregoing relationship of wavelength to antenna length provides for the relationship of bandwidth to beam width. The foregoing discussion of the construction of beams has been in terms of the coordinate along the axis of an antenna 26. Beams are also constructed along the y-coordinate in the direction of the feeder 28 to give rise to the two-dimensional array of beams 82 (FIG. 2). In the case of the x-coordinate beam, summation of the contributions of radiation signals at each of the slots 26 takes place within a waveguide 74. In the case of the formation of a y-coordinate beam, summation of the contributions of radiant energy from each of the antennas 26 takes place within the main portion 52 of the feeder 28.

The frequency translation provided by the mixers 36 (FIG. 1) and the resultant product produced by a multiplier 64 in one of the channels 60 (FIG. 6) may be understood by consideration of signals provided by two of the mixers 36. The signal appearing in one of the beams 82 and applied by an antenna 26 to a mixer 36 has an amplitude A(t) which is a function of time, t. The frequency is given by Fa. In addition, there is a time varying phase p(t). The first of the two mixers in this example employs a mixing frequency F1 provided by the generator 38 to translate the oncoming signal frequency Fa to an intermediate frequency Fa-F1. The amplitude function A(t) and the phase function p(t) are retained during this frequency translation. Similarly, at the second of the two mixers, the signal is translated to an intermediate frequency Fa-F2 wherein F2 is a reference frequency applied to the second mixer by the generator 38. Both output signals of the two mixers 36 propagate through the feeder 28 into the delay lines 40 and 42 from which they are outputted at taps 62 to the multiplier 64.

Assuming, by way of example, that the multiplier 64 is located within the central channel 60, in which case the signals propagating in the line 40 and in the line 42 have equal delays, then the multiplier 64 receives two identical replicas of each of the IF signals at the tap 62 of the line 40 and the tap 62 of the line 42. The multiplier 64 outputs a product of the signals at the two taps 62 having components in a set of frequencies including the original intermediate frequencies, the difference between the intermediate frequencies, and the sum of the intermediate frequencies. One of the band pass filters 66 is tuned to the difference frequency having the value F2−F1, which difference frequency is obtained in the multiplication of the foregoing IF signals. In particular, it is noted that the term Fa is not present in the difference frequency, as may be ascertained by an algebraic subtraction of the mathematical expressions for the two intermediate frequencies. The amplitude of the component of the product appearing in the filter 66 is proportional to [A(t)][A(t)], and the phase function is given by p(t) - p(t).

In the foregoing example, the delays imparted by the delay lines 40 and 42 to the IF signals have been presumed to be equal. Accordingly, the values of t appearing in the amplitude and the phase functions outputted by the multiplier 64 are equal. However, in the event that another pair of taps 62 of the lines 40 and 42 are employed, then, different values of t appear in each factor of the product and in each term of the phase function of the product. Thus, the amplitude and the phase information appearing at the output of a multiplier 64 differs for each of the channels 60.

It is noted that, with respect to the pair of taps 62 in the middle of the delay lines 40 and 42 wherein the delays are equal, the phase function cancels. Therefore, it is understood that a simplified embodiment of the invention can be constructed in which the delay lines are omitted and only one multiplier channel 60 is present. In such an alternative embodiment of the invention, the phase data associated with the frequency scanning characteristic of the antennas 26 would be lost, and the radiometer would produce beams in only one coordinate, the y coordinate, which is the direction of the feeder 28.

With respect to the preferred embodiment of the invention employing the delay lines 40 and 42, it is observed that the removal of a center frequency term from the output signal of each of the multipliers 64, and the retention of amplitude and phase data in the multiplier output signals enables the correlator 30 to process signals received at different carrier frequencies in the respective beams 82, thereby to enable the outputting of power spectral data by the signal processor 32 as a function of beam position.

Selection of suitable values of reference frequencies provided by the generator 38 to the mixers is accomplished as follows. As described above, the allowance of bandwidths of 2 MHz is sufficient for separation of the frequency bands associated with each of the beams 82. If desired, an allowance of a wider frequency band, such as 4 MHz may be employed to ensure further separation of the frequency bands associated with each of the beams 82. In the operation of the correlator 30, as noted above, a different intermediate frequency is provided for each of the antennas 26. As noted in the example above, it is assumed that eight waveguides 26 are to be employed in the array 24. Therefore, the amplifier 48 applies the sum of eight IF signals to the delay line 40, and the amplifier 50 applies the sum of the same eight IF signals to the delay line 42. Each of the eight signals comprises a sinusoidal waveform with both amplitude modulation and phase modulation given by the terms A(t) and p(t). Operation of the multiplier 64 in each of the channels produces the product of the sum of the eight IF signals times the sum of the eight IF signals, which product comprises numerous components at various frequencies. In particular, as noted above, these frequencies are in the form of F2−F1 wherein F1 is a reference frequency applied to one of the mixers 36 and F2 is a reference frequency applied to a second of the mixers 36. With respect to the foregoing frequency separation of 2 MHz between beams, this frequency separation is to be employed in the selection of the reference frequencies so that each of the difference frequencies (Fi−Fj) is equal to the foregoing frequency separation or an integral multiple thereof.

A feature of the invention is the provision of difference frequencies (Fi−Fj) outputted by each of the multipliers 64 wherein the values of the difference frequencies are proportional to the spacings between the antennas 26 as measured along the y-coordinate axis. In the case of an antenna array which has not been thinned, in which all 64 antennas would be present, difference frequencies produced by nested interferometers having the same baseline would be equal. Equal difference frequencies are captured by the same filter 66 in any one of the channels 60 to allow for summation of all redundant signals produced by redundant interferometric pairs of antennas. In the case of a slightly thinned array, there is less redundancy and, accordingly, less summation of redundant signals by a filter 66 in a channel 60. In the thinned array with antennas positioned, as described in FIG. 5 wherein the number of antennas is equal to the square root of the number of antennas in a full (non-thinned) array, there is no baseline redundancy as has been noted above. However, the feature of selection of difference frequencies proportional to antenna spacing is still useful for convenience in selecting values of the frequencies of the filters 66.

In the aforementioned example of a nominal radiation frequency of 20 GHz with an antenna length of 40 meters, the 2 MHz frequency separation is obtained. However, it is to be understood that other nominal values of radiation frequency and other antenna lengths may be employed. For example, a radiation frequency of 10 GHz and an antenna length of 80 meters results in the same frequency spacing of 2 MHz. A typical range of operation of the radiometer 20 is in the range of frequencies from 12 GHz to 18 Ghz. Ib accordance with the example of a radiation frequency of 20 GHz, the generator 38 provides a reference frequency of 18.00 GHz to the first mixer 36, this being the mixer at the left end of the array, as shown in FIG. 5, and also shown at the top of FIG. 1. This reference frequency may be referred to as F0. The generator 38 provides a reference frequency F1 of value 18.002 GHz to the next mixer 36 located at one unit from the left end of the array of FIG. 5. Since the array 24 is thinned, the next frequency F3 provided by the generator 38 has a value of 18.006, which frequency is applied to the mixer 36 located three units from the left end of the array in FIG. 5. The subscript in the expression for the reference frequency refers to the location of the mixer along the y axis. Similarly, the next reference frequency F7 applied to the mixer 36 has a value of 18.014 GHz. It is noted that, aside from a fixed offset of 18 GHz, the frequency F3 has a value equal to three times the above noted frequency separation between beams (2 MHz), and the frequency F7 has a value of 7 times the frequency separation. Similar comments apply to reference frequencies F16, F27, F45, and F64 which are to be applied by the generator 38 to the remaining mixers 36 coupled to the remaining antennas 26 of the array 24. It is readily verified by simple subtraction of any one of the foregoing reference frequencies from any other one of these reference frequencies, that the resultant difference frequency, to be outputted by a multiplier 64, has a value proportional to the difference between the two antennas 26 associated with the two reference frequencies.

With respect to a correlation operation, it is well known that the correlation of two waveforms can be portrayed graphicaly by reversing one of the waveforms relative to the time axis, and then sliding one waveform past the other waveform. At each position occupied by one waveform relative to the other during the sliding process, corresponding points of the waveform are multiplied together and the resulting products are summed to give the value of one point of the correlation function. Successive points are attained with successive amounts of the sliding. Mathematically, the operations are represented as an integration of the product of the two waveforms for a continuous set of values of the sliding function. In the discrete case, the integration becomes a summation and the sliding is quantized.

The correlator 30 operates in a more simple fashion to obtain substantially the same result. Instead of summing together the products of the multipliers 64 in each of the channels, the integrators 70 in each channel 60 sums together successive products obtained from the single multiplier 64 in that channel.

The equivalence between the operation of the correlator 30 and the usual correlation process can be explained as follows. A stored record of the IF signal of each of the antennas 26 appears in both of the delay lines 40 and 42. The delay time of the lines 40 and 42 is longer than the reciprocal of the bandwidth of the signal in each beam 82 (FIG. 2), thereby to assure that an adequately long section of each of the signal records appears in the delay lines 40 and 42 as is required for a correlation. In view of the fact that each of the IF signals is a sinusoid having a substantially constant amplitude and phase during an interval of time equal to the delay of each of the lines 40 and 42, it is apparent that the waveform of a stored IF signal is symmetrical about a reversal along the time axis. As a result, upon a listing of the products of each of the multipliers 64 in the row of a matrix, with successive rows being filled with the products obtained during successive shifts of the IF signals along the delay lines 40 and 42, there is obtained a matrix listing of all the products at a given difference frequency. The matrix has symmetrical properties due to the symmetry of the waveforms with the result that a summation of the columns and a summation of the rows gives comparable results. Therefore, the integrations of the products of the multipliers 64 by the corresponding integrators 70 produces a result which is substantially the same as that which would be obtained by a summation of the products of all of the multipliers 64 at each position of shift of the waveforms in the delay lines 40 and 42. Accordingly, the signals outputted by each of the channels 60 serve suitably as output points of a correlation to be applied as a set of input points to a Fourier transformer.

In the operation of each of the channels 60, there are a sufficient number of the filters 66 such that each of the filters 66 can be tuned to a different one of the difference frequencies. With respect to the diagram of FIG. 5, the center frequencies of the filters 66 correspond to the difference in frequencies between F1 and F0, F3 and F0, F7 and F0, and so on for other values of the reference frequencies. Further values of filter frequencies are given by (F3−F1), (F7−F1) . . . , (F7−F3) . . . , (F16−F7), (F27−F7) . . . , and further values as are taken by considering all of the difference frequencies produced by the eight frequencies associated with the arrangement of FIG. 5. In terms of the foregoing example of reference frequencies outputted by the generator 38 to the mixers 36, the corresponding difference frequencies to which the filters 66 are tuned are as follows (in MHz): 2, 4, 6, 8, 12, 14, 18, 22, and further values which are readily obtained by measurement of the baseline distances between all of the pairs of the antennas 26 shown in FIG. 5. These values of reference frequency are outputted by the generator 38 to each of the synchronous demodulators 68, there being both inphase and quadrature reference signals supplied at each of the difference frequencies. The demodulators 68 extract baseband components of the difference signals, which components include data carried by the amplitude function A(t) and the phase function p(t). The integration time of each of the integrators 70 may be on the order of one to two seconds. Due to the relatively long integration times, it is appreciated that the post detection bandwidth, as determined by the integration time, is much smaller than the predetection bandwidth, determined by the ratio of antenna length to radiation wavelength. Thus, while the predetection bandwidth is on the order of a megahertz, the post detection bandwidth is on the order of a Hertz.

The long integration is particularly advantageous for extracting relatively weak signals in the microwave portion of the spectrum from a noise background. The combination of amplification by the amplifiers 48 and 50 plus other amplifiers (not shown) in each channel 60 in combination with the narrow post-detection bandwidth facilitates detection and reception of the microwave signals.

In the construction of the correlator 30, the number of channels 60 employed is a matter of design choice. Preferably, the number of channels should be equal to the number of separate values of baseline provided by the various pairs of antennas in the set of nested interferometers. The number of channels 60 actually shown in FIG. 1 is presented solely for purposes of illustration, it being understood that many more channels 60 would actually be employed. The output signals of the correlator 30 are then applied to the signal processor 32 for extraction of the power density data for radiation received on each of the beams 82 in accordance with the operation of the Fourier transformers 86 and 88 as has been described above. Such transformation of correlation signals to power spectrum signals is in accordance with the well known Parseval's theorem.

By virtue of the foregoing construction and theory of operation, there is provided a radiometer which minimizes the amount of hardware, such as waveguides, employed in the construction of the microwave portion of the radiometer at the expense of the utilization of numerous filters, demodulators, and integrators in the lower frequency and baseband signal operations. However, the necessary circuitry for the lower frequency and base band signal processing operations is readily constructed in the form of integrated circuits which can be attained in a lightweight compact structure. It is also noted that the specific components employed in the construction of the microwave portion of the radiometer and of the delay lines are a matter of design choice. For example, the feeder 28 can be constructed of rectangular waveguide or coaxial cable, by way of example. The two parallel delay lines may be fabricated of waveguide, strip line, coaxial lines, or other suitable delay line structure. Only two microwave amplifiers are required in spite of the many antennas and baselines, these two amplifiers being the amplifiers 48 and 50 which are constructed preferably of field-effect transistors. The radiometer 20 provides a two-dimensional image in terms of microwave power received in each of the beam directions by the antenna array.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A microwave radiometer comprising:
    an array of antennas;
    a common microwave feeder;
    translation means connecting each of said antennas to said common feeder, said translation means offsetting a carrier frequency of incoming radiation incident at each of said antennas to an intermediate frequency, said translation means outputting a different intermediate frequency for each antenna to provide a set of intermediate signals at specific intermediate frequencies for the respective antennas, said feeder summing together said intermediate signals to provide a sum signal;
    means for amplifying the sum signal;
    correlator means coupled via said amplifying means to said feeder for providing an autocorrelation of the sum signal; and
    signal processing means coupled to said correlator means for outputting a measure of power of the incoming radiation.

2. A radiometer according to claim 1 wherein said array of antennas is thinned by arranging the antennas with a nonuniform spacing, the spacings between the respective antennas being selected to provide for a set of nested interferometer baselines.

3. A radiometer according to claim 1 wherein each of said antennas is a frequency scanning antenna, each antenna providing a limitation on bandwidth to the incoming radiation, a separate passband being associated with each orientation of a beam relative to such frequency scanning antenna.

4. A radiometer according to claim 1 wherein said translation means includes a set of microwave mixers, there being one of said mixers coupled to each of said antennas, said translation means further including a reference signal generator for providing a set of reference signals to said mixers for outputting signals of the respective antennas at the respective intermediate frequencies.

5. A radiometer according to claim 4 wherein said array of antennas is thinned by arranging the antennas with a nonuniform spacing, the spacings between the respective antennas being selected to provide for a set of nested interferometer baselines; and wherein said intermediate frequencies are proportional to the spacings between the 6. A radiometer according to claim 1 wherein said correlator means comprises a pair of tapped delay lines with oppositely directed feed of signals, signals extracted from taps of the respective delay lines being paired, said correlator means further comprising a set of multipliers coupled to respective taps of the delay lines for receiving paired signals, each of said multipliers outputting a product of paired signals, said correlator including sets of bandpass filters wherein one of the sets of filters is coupled to each of said multipliers for separating component signals of a product of each said multipliers, each bandpass filter outputting a component of a product associated with a difference between two intermediate frequencies.

7. A radiometer according to claim 6 wherein said translation means includes a set of microwave mixers, there being one of said mixers coupled to each of said antennas, said translation means further including a reference signal generator for providing a set of reference signals to said mixers for outputting signals of the respective antennas at the respective intermediate frequencies; and wherein the signals outputted by respective ones of said bandpass filters are associated with a specific value of baseline of an interferometer formed by two of said antennas.

8. A radiometer according to claim 6 wherein said array of antennas is thinned by arranging the antennas with a nonuniform spacing, the spacings between the respective antennas being selected to provide for a set of nested interferometer baselines; and wherein said intermediate frequencies are proportional to the spacings between the antennas; and wherein the signals outputted by respective ones of said bandpass filters are associated with a specific value of baseline of an interferometer formed by two of said antennas.

9. A radiometer according to claim 8 wherein said correlator means further comprises:

means coupled to output terminals of each bandpass filter for synchronously demodulating signals of said bandpass filters; and means for integrating output signals of said demodulating means;

said signal processing means including means coupled to said integrating means for providing a Fourier transformation of signals outputted by said integration means, said transformation means outputting the power received by beams of said incoming radiation, which beams are formed by said array of antennas.

10. A radiometer according to claim 1 wherein said correlator means includes sets of bandpass filters for outputting correlation signals associated with differences in intermediate frequencies between signals of respective pairs of said antennas, and wherein said correlator means further comprises:

means coupled to output terminals of said bandpass filters for synchronously demodulating signals of said bandpass filters; and means for integrating output signals of said demodulating means;

said signal processing means including Fourier transformation means coupled to said correlator means for converting said output correlation signals to power spectral density signals, the power of incoming microwave radiation incident upon said array of antennas being represented by said power spectral density signals.

11. A microwave radiometer comprising:

an array of antennas spaced apart with predetermined spacings;

a common microwave feeder for receiving radiant energy from each of the antennas of the array;

means for translating signals of respective ones of said antennas to intermediate frequencies, said translating means employing a plurality of reference signals to establish predetermined differences in frequency among the intermediate frequencies, which differences in frequency are proportional to spacings between respective ones of said antennas;

correlator means coupled to said translating means for providing an autocorrelation of a sum of the signals at the intermediate frequencies to output a set of output correlation signals; and Fourier transformation means coupled to said correlator means for converting said output correlating signals to power spectral density signals, the power of incoming microwave radiation incident upon said array of antennas being represented by said power spectral density signals.

12. A radiometer according to claim 11 wherein said correlator means comprises a pair of parallel delay lines for propagating signals in opposed directions, a set of multiplying means extracting signals from paired taps of said delay lines, and a bank of filters coupled to each of said multiplying means for extracting component parts of said correlation output signals at each of a plurality of difference frequencies having values equal to differences between said intermediate frequencies.

* * * * *

UNITED STATES PATENT AND TRADEMARK OFFICE
CERTIFICATE OF CORRECTION

PATENT NO. : 4,864,309

DATED : September 05, 1989

INVENTOR(S) : Carl A. Wiley

It is certified that error appears in the above-identified patent and that said Letters Patent is hereby corrected as shown below:

Claim 5, col. 13, line 20, after "the" insert --antennas.--.

Signed and Sealed this

Thirteenth Day of November, 1990

*Attest:*

HARRY F. MANBECK, JR.

*Attesting Officer*    *Commissioner of Patents and Trademarks*